United States Patent [19]

Walters

[11] Patent Number: 5,369,952
[45] Date of Patent: Dec. 6, 1994

[54] VARIABLE FRICTION FORCE DAMPER

[75] Inventor: Steven A. Walters, Fairfield, Ohio

[73] Assignee: General Electric Company, Cincinnati, Ohio

[21] Appl. No.: 93,912

[22] Filed: Jul. 20, 1993

[51] Int. Cl.⁵ .................................. F02C 7/20
[52] U.S. Cl. ..................... 60/39.31; 60/39.32; 60/739; 248/638; 248/636; 248/288.1; 188/381
[58] Field of Search .................. 60/39.08, 39.31, 39.32, 60/39.33, 739; 184/6.11; 188/381; 248/578, 638, 550, 562, 568, 569, 570, 636, 288.1

[56] References Cited

U.S. PATENT DOCUMENTS

| | | | |
|---|---|---|---|
| 1,751,743 | 3/1930 | Link . | |
| 2,981,511 | 4/1961 | Suozzo | 248/58 |
| 3,027,715 | 4/1962 | Morris | 60/39.32 |
| 3,362,504 | 1/1968 | Maldarelli | 188/1 |
| 3,455,527 | 7/1969 | Suozzo | 248/550 |
| 3,690,413 | 9/1972 | Airheart | 188/1 B |
| 3,826,088 | 7/1974 | Nash et al. | 60/261 |
| 4,920,742 | 5/1990 | Nash et al. | 60/39.32 |
| 5,273,249 | 12/1993 | Peterson | 60/39.32 |

FOREIGN PATENT DOCUMENTS

| | | | |
|---|---|---|---|
| 0094044 | 7/1980 | Japan | 188/381 |
| 0703396 | 12/1979 | U.S.S.R. | 188/381 |
| 1483132 | 5/1989 | U.S.S.R. | 188/381 |

*Primary Examiner*—Richard A. Bertsch
*Assistant Examiner*—William Wicker
*Attorney, Agent, or Firm*—Jerome C. Squillaro; Bernard E. Shay

[57] ABSTRACT

A variable friction force damper utilizes geometric variations in a sliding surface to vary the frictional force. In particular, variation in thickness of the member on which the sliding surface is formed produces a corresponding variation in the displacement of a compression spring. This variation in spring displacement produces a variation in the compression force exerted by the spring, i.e., the force with which the sliding member is pressed against the sliding surface. This in turn causes a variation in the frictional force which the sliding surface exerts on the sliding member. The result is a variable friction force damper having a variable damping capability which allows a controlled response at variable input levels.

13 Claims, 3 Drawing Sheets

VARIABLE FRICTION FORCE DAMPER

FIELD OF THE INVENTION

The present invention generally relates to devices for damping vibrations in a component of a machine or engine. In particular, the invention relates to devices installed in a gas turbine engine for supporting a relatively cool member, such as a fuel manifold on a relatively hot member, such as a combustor casing, in a manner to accommodate differential thermal growth and retain dynamic stability.

BACKGROUND OF THE INVENTION

Frictional dampers are currently used in bracket designs to provide a constant friction force between surfaces to allow damping and misalignment in tube systems. Basically, a frictional damper transforms the kinetic energy of the system into work in the bracket and then dissipates a portion of that work via heat due to friction.

Used in a static application, stresses due to the misalignment of the system will be reduced. For example, sliding of the mating frictional surfaces may be designed to occur to relieve thermal stresses between two components. When sufficient force is exerted on the bracket parallel to the mating surfaces, the static friction force due to a normal spring load will be overcome and sliding will occur. This misalignment capability will reduce thermal stresses in the system.

The foregoing concept is also valid when applied to dynamic systems in vibration. When the amplitude of vibratory displacement exceeds a certain amount, the frictional damper activates. However, in all applications for a frictional damper of conventional design, the opposing frictional force remains constant during the vibratory displacement. Therefore, as the input increases, the response of the system will also increase uncontrollably.

A frictional damper for damping vibratory displacement of a motor or engine is disclosed in U.S. Pat. No. 1,751,743 to Link. This frictional damper comprises an upwardly extending bar connected to the motor or engine. The end of that bar is seated between a pair of opposing flat friction faces which bear against respective sides of the upwardly extending bar. A pair of springs compress this sandwich construction to a degree such that the upwardly extending bar is able to slide between the friction faces upon overcoming the frictional forces opposing such sliding. These frictional forces, which remain constant, act to damp engine vibrations.

U.S. Pat. No. 3,362,504 to Maldarelli discloses a mechanical damper comprising a damper pad which is pushed against a damper plate in response to downward displacement of a lever block connected to a vibrating component. At the same time, the displaced lever block urges the damper pad to slide relative to the damper plate. A friction force is thus generated which resists motion parallel to the plane of the damper plate and has a magnitude equal to the product of the force of the damper pad against the damper plate and the coefficient of friction of the two surfaces. The friction force produced resists the motion of the damper pad and is transmitted via intermediate elements to the lever arm. Thus the kinetic energy of whatever is producing force (i.e., the device being damped) is converted to heat (friction between the damper pad and the damper plate) and its movement is consequently damped. The lever arm and the damper pad are coupled via a roller bearing which bears against a plane inclined relative to the direction of translation of the lever arm. The magnitude of the damping action can be adjusted by setting the angle of the inclined plane.

U.S. Pat. No. 3,690,413 to Airheart discloses a two-stage motion damper. In the first stage a frictional damper damps oscillations in response to the force exerted by yieldable means (e.g., Belleville washers). The frictional damper comprises a pair of displaceable members which slide with friction between respective pairs of opposing friction pad surfaces. In response to displacement of the displaceable member beyond a predetermined point, additional force is applied to the damper by a fluid pressure-responsive actuator.

SUMMARY OF THE INVENTION

The present invention is a variable friction force damper suitable for use in damping oscillatory motions in a mechanical system. The variable friction force damper of the invention was initially conceived for use on sheet metal brackets in tubing systems on external configurations. However, the concept of the invention has application in any product which requires variable controlled damping capability.

The variable friction force damper of the invention utilizes geometric variations in the sliding surface to vary the frictional force. In particular, variation in thickness of the member on which the sliding surface is formed produces a corresponding variation in the displacement of a compression spring. This variation in spring displacement produces a variation in the compression force exerted by the spring, i.e., the force with which the sliding member is pressed against the sliding surface. This in turn causes a variation in the frictional force which the sliding surface exerts on the sliding member. The result is a variable friction force damper having a variable damping capability which allows a controlled response at variable input levels.

In accordance with the preferred embodiment of the invention, the variable friction force damper takes the form of a sheet metal bracket consisting of two separate sheet metal pieces which serve both as the frictional mating surfaces and as the bracket's structure. One of the bracket halves is slotted and machined to provide a member of variable thickness on which a spring load assembly slides. The spring load assembly is mounted on the other bracket half which displaces in response to oscillation of a component connected thereto. The variable thickness produces a variable spring load on the bracket surface as the spring load assembly slides relative to the slotted bracket half.

The spring load assembly comprises a fastener, a washer and a spring means. The spring rate/displacement will determine the initial spring load. That load will vary as the oscillating bracket half displaces relative to the slotted bracket half, driving the spring load assembly up and/or down the ramp or other geometrical variation that forms the sliding surface on the slotted bracket half. A curved washer (or combination of washers) or a simple compression spring can be used to supply the spring load. Wear on the bracket surfaces can be controlled by material selection, surface finish, wear coating, etc. For example, the frictional surfaces may be coated with a material such as Teflon or tungsten carbide.

The advantage of variable friction force damper designed in accordance with the invention is the variable damping capability. Geometrical changes such as ramp grade, curvature, etc. can be easily designed to provide the variable damping required by a specific application. One application of the invention is in coupling a fuel manifold to a combustor case of a gas turbine engine.

It is desirable that the variable friction force damper bracket in accordance with the preferred embodiment of the invention "hang up" or provide no relative motion between bracket halves for oscillatory responses of low amplitude. This means that at low-amplitude responses, the damper acts like a fixed bracket and at some higher amplitude level, the frictional damper activates. This feature is desired to reduce wear and extend the life of the bracket.

The broad concept of a variable friction force damper in accordance with the invention has application in any system requiring a misalignment or variable damping capability. Alternative designs include any frictional damper where the spring load can vary.

DETAILED DESCRIPTION OF THE PREFERRED EMBODIMENTS

Figures 2, 3:
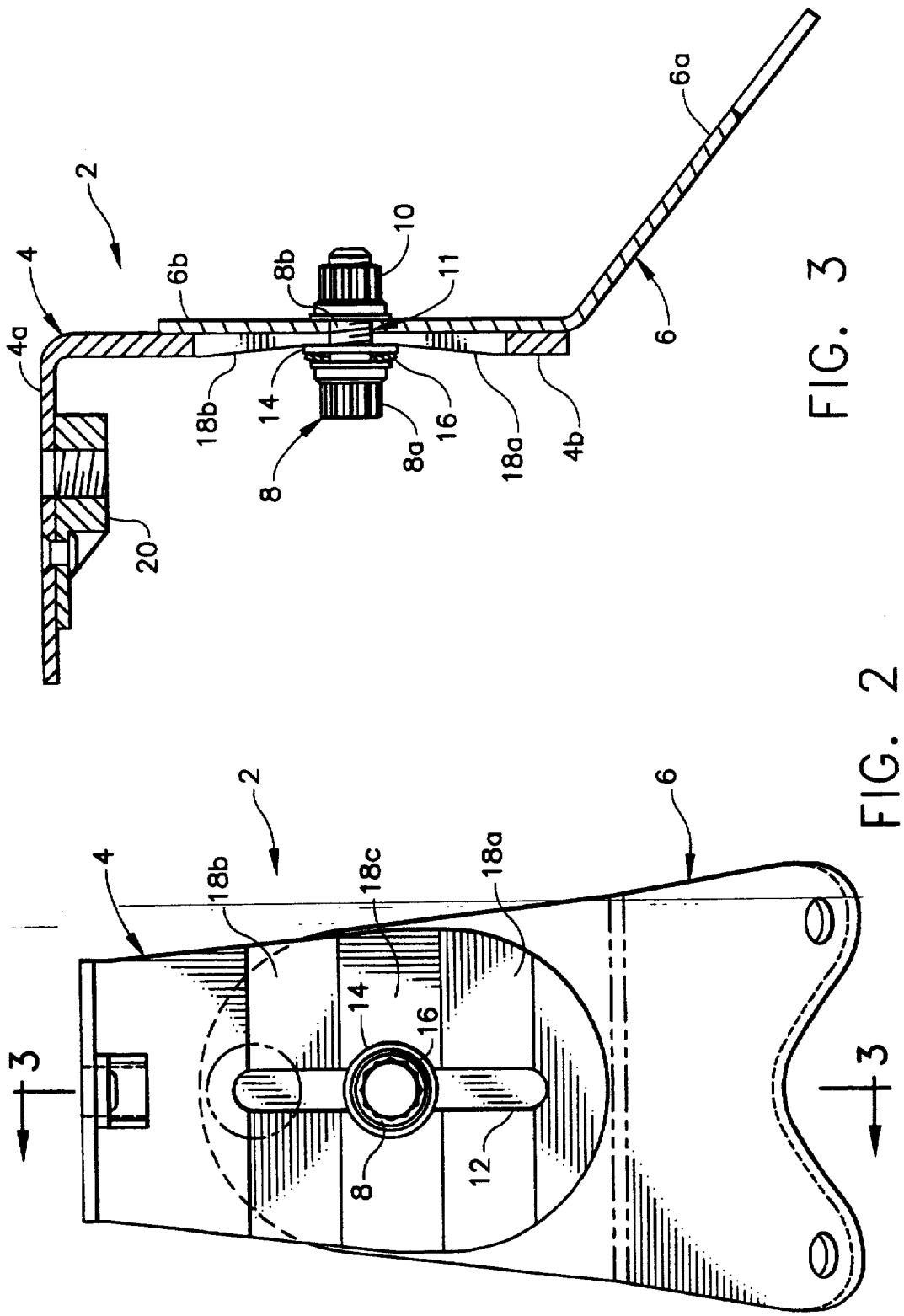
FIG. 2 is a front view of a variable friction force damper in accordance with the preferred embodiment of the invention.
FIG. 3 is a sectional view, taken along section line 3—3, of the variable friction force damper shown in FIG. 2.

One preferred embodiment of the invention, suitable for use as a bracket for externally mounting a tubing system on an aircraft engine, is depicted in FIGS. 2 and 3. The variable friction force damper in accordance with this embodiment is a sheet metal bracket 2 comprising a pair of bracket members 4 and 6 made of sheet metal. Bracket member 4 has a mounting portion 4a and a mating portion 4b. Similarly, bracket member 6 has a mounting portion 6a and a mating portion 6b. The relative angles between the mounting portion and the mating portion of the respective bracket members are dictated by the external configuration of the tubing system and the engine section on which the tubing system will be mounted.

Mating portion 4b of bracket member 4 and mating portion 6b of bracket member 6 each have a planar frictional surface. Bracket members 4 and 6 are arranged such that these planar frictional surfaces oppose each other in mating frictional sliding contact, as shown in FIG. 3.

Bracket members 4 and 6 are fastened together by means of a bolt 8 having a threaded portion 8a and a head 8b, and a nut 10 which screws onto threaded portion 8a. Mating portion 6b has a circular aperture 11 for receiving the threaded portion 8a of bolt 8. Mating portion 4b has a slot 12 (see FIG. 2) which receives threaded portion 8a of bolt 8.

Slot 12 is depicted in FIG. 2 as being a straight slot with rounded ends. The straightness of this slot dictates that mating portion 4b of bracket member 4 will slide along a straight line relative to mating portion 6b of bracket member 6. However, for some applications it may be desirable that the slot in mating portion 6b of bracket member 6 be curved, in which case mating portion 4b of bracket member 4 will slide along a curved arc.

Referring again to FIG. 3, a washer 14 and a spring means 16 are passed over the threaded portion 8a of bolt 8 prior to passage of threaded portion 8a through slot 12 of mating portion 4b and circular aperture 11 of mating portion 6b. The spring means 16 is arranged between the bolt head 8b and the washer 14. The spring means may comprise a curved washer (or combination of washers) or a simple compression spring. A curved washer is depicted in FIG. 3.

During installation of the spring assembly, nut 10 is tightened on threaded portion 8b of bolt 8 to a degree such that curved washer 16 is compressed, but not so tight that sliding of mating portion 4b relative to mating portion 6b is prevented for the range of vibrational forces of interest. The compressed curved washer will exert a spring load $F_s$ that presses the planar frictional surface of mating portion 4b against the planar frictional surface of mating portion 6b. The spring load $F_s$ acts in a direction normal to the planar frictional surfaces to produce a frictional force $F_{fr}$ in the plane of contact between the frictional surfaces, which frictional force must be overcome by the applied vibrational force before sliding of mating portion 4b relative to mating portion 6b will occur. In accordance with well known theory, $F_{fr} = C_{fr}F_s$, where $C_{fr}$ is the coefficient of friction, which is a function of the area of contact and the respective roughness of the frictional surfaces.

During sliding of mating portion 4b relative to mating portion 6b, the frictional force $F_{fr}$ generates an amount of heat which is a function of the amount of sliding displacement. In this way, vibrational energy is dissipated as heat and relative oscillatory movement of bracket members 4 and 6 (and components connected thereto) is damped.

As previously described, one side of mating portion 4b of bracket member 4 has a frictional surface which contacts the opposing frictional surface of mating portion 6b of bracket member 6. The other side of mating portion 4b has a pair of ramped planar sliding surfaces 18a and 18b on which washer 14 slides during displacement of bracket member 4 relative to bracket member 6. Ramped sliding surfaces 18a and 18b are connected by a planar sliding surface 18c, which is disposed parallel to the planar frictional surface on the opposite side of mating portion 4b, thereby forming a section of constant thickness.

In accordance with the invention, the geometric variation of the sliding surfaces is used to vary the frictional force during sliding displacement. In the embodiment depicted in FIGS. 2 and 3, the ramped sliding surfaces are disposed such that the thickness of mating portion 4b increases with increasing distance from the flat planar sliding surface 18c. In particular, variation in the thickness of mating portion 4b produces a corresponding variation in the displacement of the spring means. This variation in spring displacement produces a variation in the compression force exerted by the spring, i.e., the force with which the sliding member is pressed against the frictional surface. This in turn causes a variation in the mutual frictional force which the frictional surfaces exert-on each other.

The result is a variable friction force damper having a variable damping capability which allows a controlled response at variable input levels. As the amplitude of the oscillation increases, i.e., as the spring assembly travels up either ramped sliding surface 18a or 18b, the spring compression and consequently the spring load increase, producing an increase in the frictional force $F_{fr}$. As the frictional force increases, the mating portion 4b meets increasing resistance to further displacement in the direction of increasing amplitude. Thus, the oscillation of bracket member 4 relative to bracket member 6 is damped.

Figure 1:
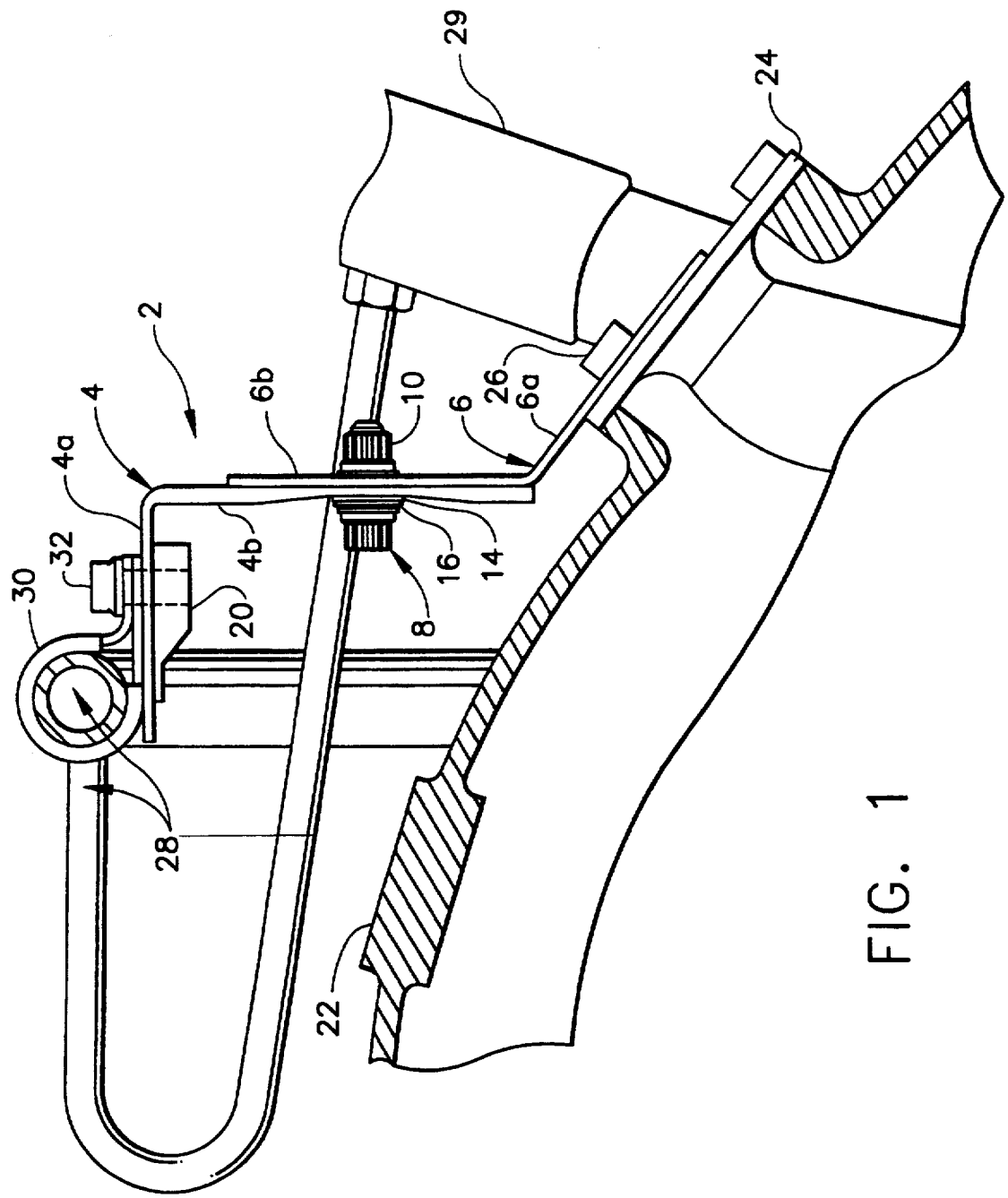
FIG. 1 is a sectional view of a portion of a gas turbine aircraft engine incorporating a variable friction force damper in accordance with a preferred embodiment of the invention.

The preferred embodiment of the invention has application to the field of aircraft engines. In particular, as shown in FIG. 1, a variable friction force damper 2 in accordance with the invention is advantageously incorporated in the structure for mounting a fuel manifold 28 on a combustor case 22 of a gas turbine aircraft engine. The fuel manifold 28 comprises a circumferential pipe and a plurality of J-shaped pipes connecting the circumferential pipe to a respective plurality of fuel nozzles 29, only one of which is depicted in FIG. 1. The circumferential pipe of fuel manifold 28 encircles the combustor case 22 and is supported by a plurality of variable friction force dampers 4 (only one of which is shown in FIG. 1) at points circumferentially distributed therearound.

For each variable friction force damper, mounting portion 4a of bracket member 4 is coupled to the fuel manifold 28 using a conventional pipe clamp 30 and a bolt 32 which threadably engages a nut assembly 20 riveted (or welded) to mounting portion 4a. Also mounting portion 6a of bracket member 6 is coupled to a fuel nozzle flange 24 by means of a bolt 26.

The result of the arrangement depicted in FIG. 1 is that oscillations of the combustor case 22 are not freely transmitted to the fuel manifold 28, but rather are damped by the intervening variable friction force damper 2. Such arrangement reduces the susceptibility of the fuel manifold to vibration-caused damage during operation of the gas turbine aircraft engine.

The efficacy of the invention has been demonstrated by shake table testing on the fuel manifold of a gas turbine aircraft engine. A combustor case was mounted on the shake table, while the fuel manifold was mounted on the combustor case by means of variable friction force dampers in accordance with the invention. Accelerometers were mounted on the fuel manifold to measure the response of the manifold to shaking of the combustor case. The test was conducted by shaking the table (with the combustor case securely mounted thereon) back and forth in one direction at a given frequency and a given amplitude. Each peak-to-peak displacement of 2 mils at 140 Hz produced a force of 2 g's on the fuel manifold.

Figure 4:
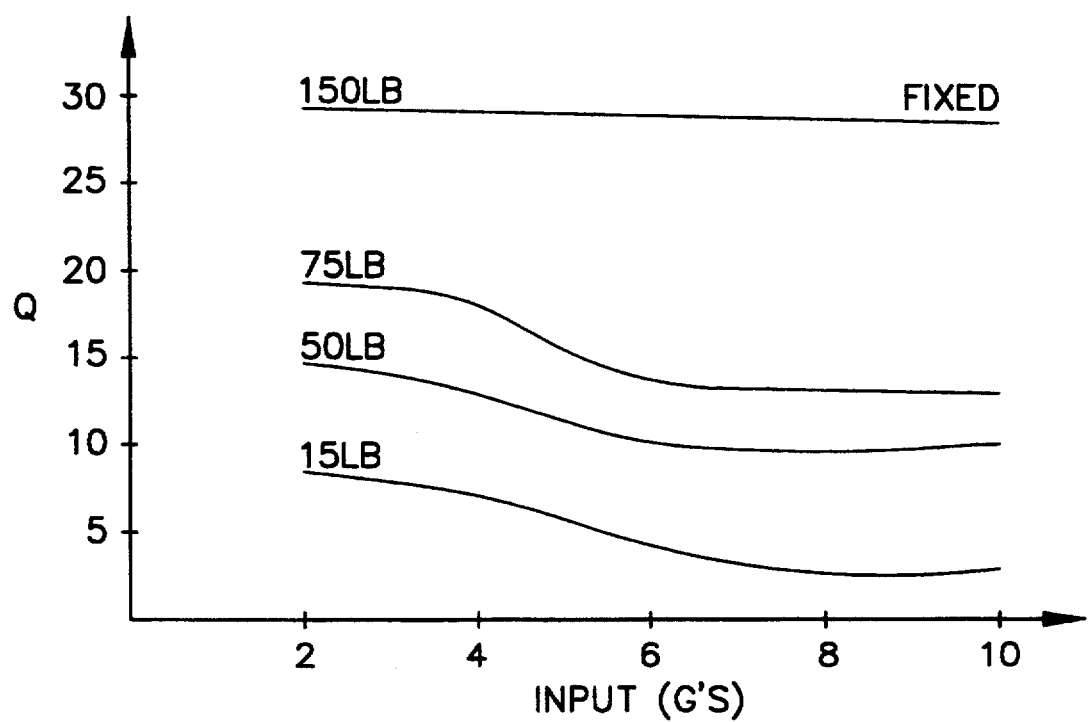
FIG. 4 is a general plot of variable spring loads on an amplification factor vs. input graph for a fuel manifold coupled to a combustor case of a gas turbine aircraft engine by means of a variable friction force damper in accordance with the invention.

The response R of the fuel manifold equals the product of the input I and the amplification factor Q. The amplification factor Q is in turn a function of the spring load. FIG. 4 is a general plot of variable spring loads on an amplification factor vs. input graph. From this graph, it can be seen that if a constant response (acceleration) is desired (or any other controlled response) at an increasing input, a variable spring load (friction force) is required. To achieve a constant response for variable inputs, the amplification factor must be varied, e.g., by varying the spring load. For example, to achieve a constant 30 g response for inputs of 2 g, 4 g and 6 g, the amplification factor must be equal to 15, 7.5 and 5, respectively. Referring to FIG. 4, it can be seen that these amplification factors can be attained by spring loads of 55, 17 and 13 lbs., respectively. It should be understood that these numbers are empirically obtained for a particular system. The general plot of the spring load on the graph of amplification factor vs. input will be different for different systems.

The foregoing preferred embodiment of the invention have been disclosed for the purpose of illustration. Variations and modifications of that embodiment will be readily apparent to mechanical engineers of ordinary skill. For example, curved sliding surfaces could be used in place of planar ramped sliding surfaces. Also, the invention has application in systems subject to oscillations other than gas turbine aircraft engines. A variable friction force damper could also be readily designed to provide a controlled decrease in damping instead of a controlled increase in damping. All such variations and modifications are intended to be encompassed by the claims appended hereto.

I claim:

1. A variable friction force damper comprising:
    a first support member having a first planar frictional surface;
    a second support member having a second planar frictional surface, said first and second support members being arranged so that said first and second planar frictional surfaces are mutually parallel and in contact;
    means for producing a sliding and non-locking frictional load between said planar frictional surfaces in a direction parallel thereto, which frictional load increases during relative sliding displacement of said first and second support members;
    said frictional load means comprising means for applying a spring load in a direction normal to said planar frictional surfaces, whereby said first and second planar frictional surfaces are pressed together with a force equal to said spring load, means for coupling said spring load applying means to said second support member in a manner which allows said first support member to slidably displace relative to said second support member, means for varying said spring load applied by said spring load applying means during relative sliding displacement of said first and second support members;
    said spring load varying means are a portion of said first support member having a variable thickness; and
    said first and second support members comprising bracket halves made of sheet metal.

2. The variable friction force damper as defined in claim 1, wherein said variable thickness portion of said first support member has a surface forming a part of said first planar frictional surface on one side thereof and has a ramped planar sliding surface on the other side thereof.

3. The variable friction force damper as defined in claim 1, wherein said spring load applying means comprises a spring means arranged to undergo an amount of compression which is a function of said variable thickness.

4. The variable friction force damper as defined in claim 1, wherein said coupling means comprises means for supporting said spring means and means for transmitting said spring load to said first support member.

5. The variable friction force damper as defined in claim 4, wherein said variable thickness portion of said first support member has a surface forming a part of said first planar frictional surface on one side thereof and has a ramped planar sliding surface on the other side thereof, said spring load transmitting means being arranged to transmit said spring load from said spring means to said ramped planar sliding surface.

6. The variable friction force damper as defined in claim 5, wherein said supporting means comprises a nut and a bolt threadably coupled to each other, said spring load transmitting means comprises a washer, said spring means is arranged between said washer and a head of said bolt, and said first support member has a slot formed therein for guiding a stem of said bolt during sliding displacement of said first support member relative to said second support member.

7. A system comprising a first structural component which oscillates during operation of said system, a second structural component supported by said first structural component, and means for damping oscillation of said second structural component in response to oscillation of said first structural component, said damping means comprising:
   a first support member on which said first structural component is mounted, said first support member having a first planar frictional surface;
   a second support member mounted on said second structural component, said second support member having a second planar frictional surface, said first and second support members being arranged so that said first and second planar frictional surfaces are mutually parallel and in contact;
   means for producing a sliding and non-locking frictional load between said planar frictional surfaces in a direction parallel thereto, which frictional load increases during relative sliding displacement of said first and second support members;
   said frictional load means comprising means for applying a spring load in a direction normal to said planar frictional surfaces, whereby said first and second planar frictional surfaces are pressed together with a force equal to said spring load, means for coupling said spring load applying means to said second support member in a manner which allows said first support member to slidably displace relative to said second support member, means for varying said spring load applied by said spring load applying means during relative sliding displacement of said first and second support members;
   said spring load varying means are a portion of said first support member having a variable thickness; and
   said first and second support members comprising bracket halves made of sheet metal.

8. The system as defined in claim 7, wherein said variable thickness portion of said first support member has a surface forming a part of said first planar frictional surface on one side thereof and has a ramped planar sliding surface on the other side thereof.

9. The system as defined in claim 7, wherein said first structural component comprises a fuel manifold and said second structural component comprises a combustor case of a gas turbine aircraft engine.

10. The system as defined in claim 7, wherein said spring load applying means comprises a spring means arranged to undergo an amount of compression which is a function of said variable thickness.

11. The system as defined in claim 10, wherein said coupling means comprises means for supporting said spring means and means for transmitting said spring load to said first support member.

12. The system as defined in claim 11, wherein said variable thickness portion of said first support member has a surface forming a part of said first planar frictional surface on one side thereof and has a ramped planar sliding surface on the other side thereof, said spring load transmitting means being arranged to transmit said spring load from said spring means to said ramped planar sliding surface.

13. The system as defined in claim 12 wherein said supporting means comprises a nut and a bolt threadably coupled to each other, said spring load transmitting means comprises a washer, said spring means is arranged between said washer and a head of said bolt, and said first support member has a slot formed therein for guiding a stem of said bolt during sliding displacement of said first support member relative to said second support member.

* * * * *